(12) United States Patent
Feldman-Peabody

(10) Patent No.: US 8,350,585 B2
(45) Date of Patent: Jan. 8, 2013

(54) SIMULTANEOUS QE SCANNING SYSTEM AND METHODS FOR PHOTOVOLTAIC DEVICES

(75) Inventor: Scott Daniel Feldman-Peabody, Golden, CO (US)

(73) Assignee: PrimeStar Solar, Inc., Arvada, CO (US)

( * ) Notice: Subject to any disclaimer, the term of this patent is extended or adjusted under 35 U.S.C. 154(b) by 0 days.

(21) Appl. No.: 13/149,100

(22) Filed: May 31, 2011

(65) Prior Publication Data
US 2012/0049880 A1   Mar. 1, 2012

(51) Int. Cl.
*G01R 31/26* (2006.01)
(52) U.S. Cl. ........ 324/761.01; 324/762.01; 324/537; 356/218; 356/213; 250/203.4; 250/214 R
(58) Field of Classification Search ......... 324/761.01, 324/501
See application file for complete search history.

(56) References Cited

U.S. PATENT DOCUMENTS

| | | | | |
|---|---|---|---|---|
| 3,878,107 | A * | 4/1975 | Pembrook et al. | 250/343 |
| 4,122,383 | A * | 10/1978 | Frosch et al. | 324/754.23 |
| 4,564,808 | A * | 1/1986 | Faughnan et al. | 324/761.01 |
| 4,708,494 | A * | 11/1987 | Kleinerman | 374/161 |
| 5,394,098 | A * | 2/1995 | Meyrueix et al. | 324/754.23 |
| 6,005,252 | A * | 12/1999 | Forrest et al. | 250/458.1 |
| 6,639,421 | B1 * | 10/2003 | Yoshino et al. | 324/761.01 |
| 6,972,431 | B2 * | 12/2005 | Forrest et al. | 257/40 |
| 7,059,766 | B2 * | 6/2006 | Lemoine et al. | 374/161 |
| 7,696,461 | B2 * | 4/2010 | Sinton et al. | 250/203.4 |
| 2007/0119496 | A1 * | 5/2007 | Baldo et al. | 136/252 |
| 2009/0206287 | A1 | 8/2009 | Trupke et al. | |
| 2009/0256581 | A1 | 10/2009 | Lu et al. | |
| 2010/0219327 | A1 * | 9/2010 | Arbore et al. | 250/206 |
| 2010/0237895 | A1 | 9/2010 | Chung | |
| 2011/0227598 | A1 * | 9/2011 | Park et al. | 324/761.01 |

OTHER PUBLICATIONS

Alda et al., "Instrumentation for Quantum Efficiency Measurement of Solar Cells", *Photovoltaics World*, Aug. 4, 2010.

* cited by examiner

*Primary Examiner* — Richard Isla Rodas
(74) *Attorney, Agent, or Firm* — Dority & Manning, P.A.

(57) ABSTRACT

Methods for simultaneously making quantum efficiency measurements at multiple points in a photovoltaic cell are provided. A light beam (e.g., monochromatic light) can be directed to a first beam splitter, where it is split into a first reflected portion and a first passthrough portion such that the first reflected portion is directed to a first point on the photovoltaic cell. The first reflected portion can then be chopped at a first frequency between the first beam splitter and the first point. The first passthrough portion of the light beam can be reflected at a second beam splitter to a second point on the photovoltaic cell. The second reflected portion can then be chopped at a second frequency between the second beam splitter and the second point. Finally, the quantum efficiency can be calculated at both the first point and the second point. Systems are also generally provided for simultaneously making quantum efficiency measurements at multiple points in a photovoltaic cell.

8 Claims, 5 Drawing Sheets

SIMULTANEOUS QE SCANNING SYSTEM AND METHODS FOR PHOTOVOLTAIC DEVICES

FIELD OF THE INVENTION

The subject matter disclosed herein relates generally to the field of quantum efficiency measuring of photovoltaic devices. More particularly, the subject matter is related to methods and apparatus for simultaneously measuring the quantum efficiency of a photovoltaic (PV) cell at different points within the cell.

BACKGROUND OF THE INVENTION

Photodiodes and solar cells are often characterized by quantum efficiency (QE), which is generally expressed in units of outgoing electrons per incident photon.

Historically, apparatuses used to measure QE have used a conventional broadband lightsource such as quartz tungsten halogen, xenon arc, or metal halide, where the light is spectrally resolved with either a wavelength scanning monochromator or a set of bandpass filters. QE measurements are made sequentially as the apparatus is mechanically stepped through a series of predetermined wavelengths by adjusting either the monochromator diffraction grating angle or placing individual bandpass filters into the beam of broadband light. Alternatively, monochromator-based systems offer adjustable wavelength resolution and essentially continuous coverage over the range of interest. For solar cells, the range of interest can include wavelengths from the shortest solar emissions around 300 nm to the wavelength corresponding to the smallest bandgap present in the active region of the device, for example approximately 900 nm for cadmium telluride, and longer for some other materials. However, when scanning such a large wavelength range, monochromators require the use of order-sorting filters to prevent higher order diffraction from reaching the output slit, and also leak a measurable amount of broadband stray light that can not readily be removed by filters.

In these systems, a basic limitation is the speed with which the system can scan through a set of wavelengths. The long measurement time of conventional QE systems prevents the cell from being tested at multiple points of the cell to study localized or spatially varying effects. However, knowing the QE of a cell at different points can allow for better understanding of the films. For example, when referring to a cadmium telluride (CdTe) based photovoltaic device including both a CdTe layer and a cadmium sulfide (CdS) layer, a QE curve can show the CdS thickness. CdS absorbs at about 520 nm and below, whereas CdTe absorbs at ~850 nm and below. By comparing the QE at certain wavelengths, for example at 600 nm and at 450 nm, the relative CdS thickness can be estimated.

As such, a need exists for a system and method capable of simultaneously measuring the QE at different points within a photovoltaic cell.

BRIEF DESCRIPTION OF THE INVENTION

Aspects and advantages of the invention will be set forth in part in the following description, or may be obvious from the description, or may be learned through practice of the invention.

Methods are generally provided for simultaneously making quantum efficiency measurements at multiple points in a photovoltaic cell. For example, a light beam (e.g., monochromatic light) can be directed to a first beam splitter, where it is split into a first reflected portion and a first passthrough portion such that the first reflected portion is directed to a first point on the photovoltaic cell. The first reflected portion can then be chopped at a first frequency between the first beam splitter and the first point. The first passthrough portion of the light beam can be reflected at a second beam splitter to a second point on the photovoltaic cell. The second reflected portion can then be chopped at a second frequency between the second beam splitter and the second point. Finally, the quantum efficiency can be calculated at both the first point and the second point.

Systems are also generally provided for simultaneously making quantum efficiency measurements at multiple points in a photovoltaic cell.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
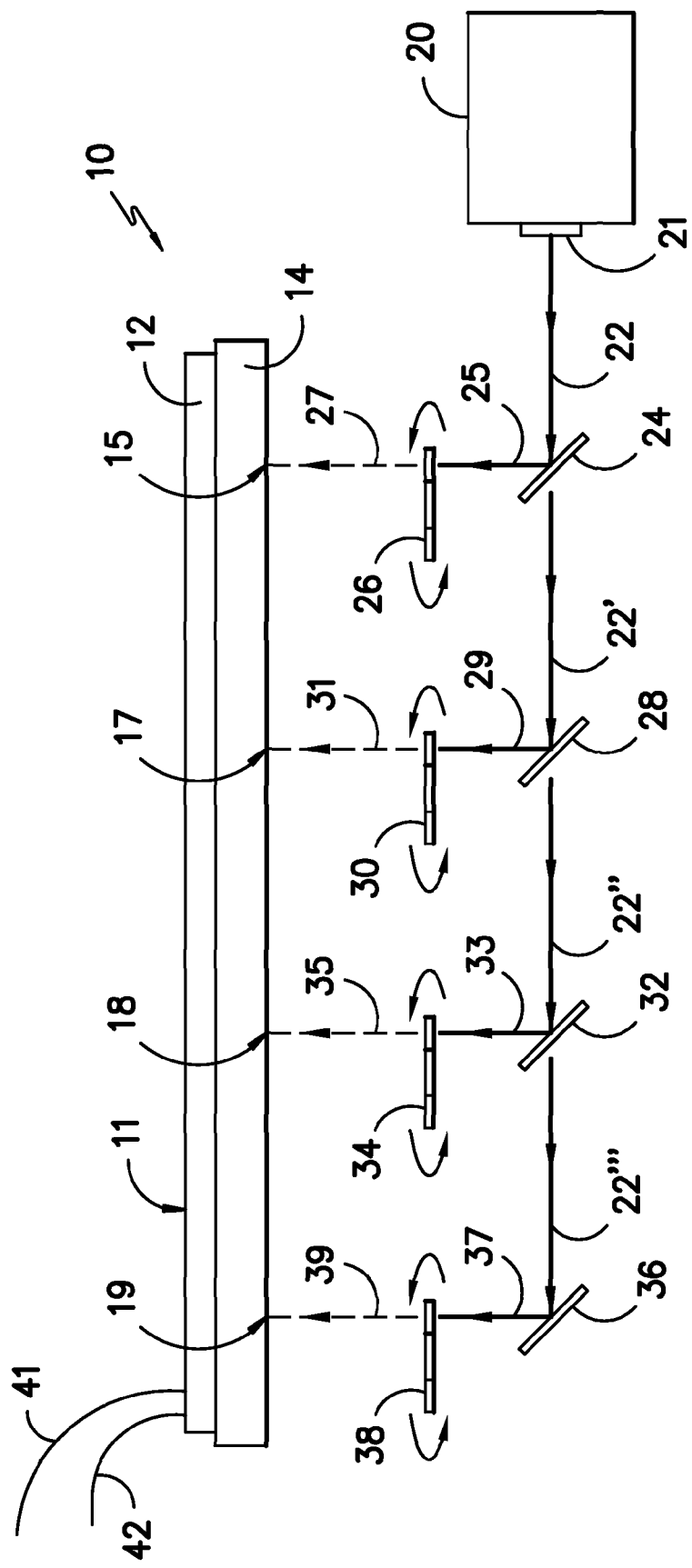
FIG. 1 shows a crossectional view of a PV cell being tested according to one embodiment of the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Methods and apparatus are generally provided for the simultaneous measurement of the quantum efficiency at multiple areas of a photovoltaic (PV) cell on a PV device. Accordingly, variations in the quantum efficiency across the PV cell can be detected, allowing for adjusts to the manufacturing process in order to produce more uniform cells. As such, these methods can lead to improved uniformity of PV cells in a mass manufacturing setting. For example, in one embodiment, the quantum efficiency measurements across the PV cell can be used to calculate the thickness of the heterojunction and/or absorber layer of the cell.

Figure 2:
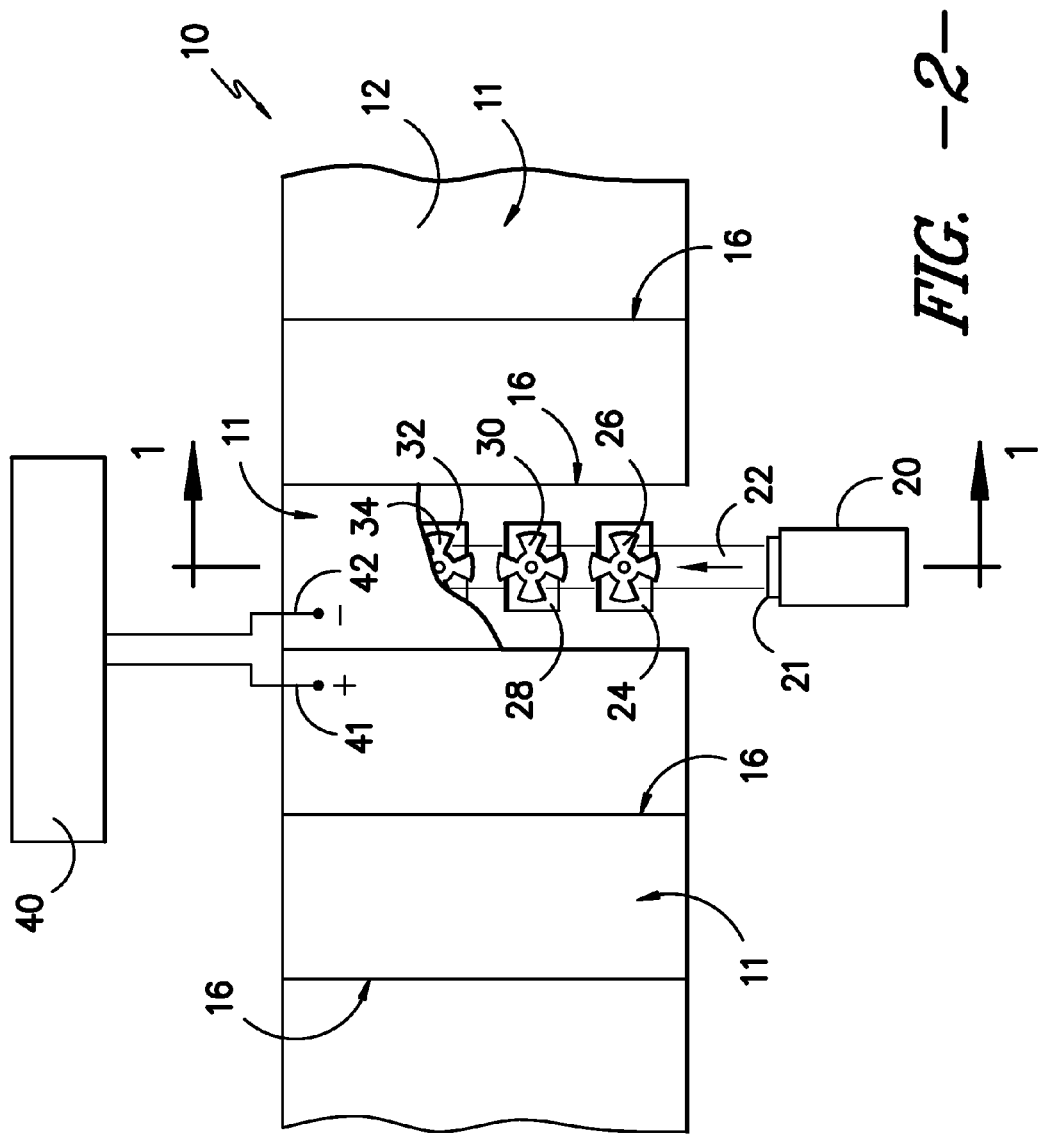
FIG. 2 shows a top view of a PV device being tested at a single cell according to one embodiment of the present invention

FIGS. 1 and 2 show quantum efficiency being tested at multiple areas on a PV cell 11 of a PV device 10. Generally, the photovoltaic cell 10 has thin film layers 12 overlying a glass superstrate 14. The thin film layers 12 are separated by scribe lines 16 to form individual cells 11 of the PV device 10.

A monochromatic light source 20 produces a monochromatic light beam 22 focused through lens 21. As used herein, the term "monochromatic light" means having wavelengths confined to an extremely narrow range. For example, the monochromatic light can have a wavelength within a range of about 5 nm (e.g., about 300 nm+/−about 2.5 nm), such as within a range of about 2 nm (e.g., about 300 nm+/−about 1 nm). In one particular embodiment, the monochromatic light can have a single wavelength (i.e., within a range of about 0.2 nm).

Figure 3:
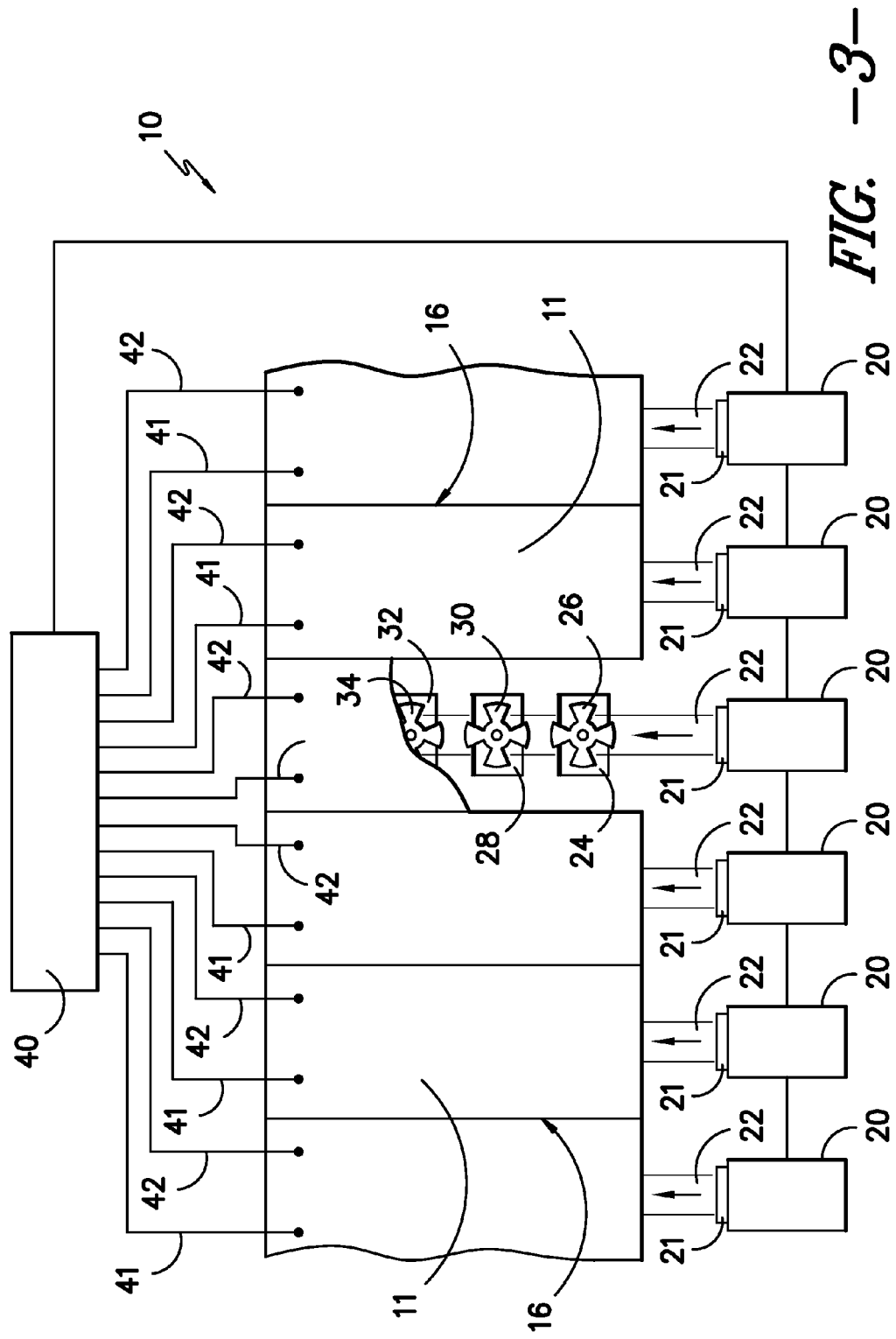
FIG. 3 shows a top view of a PV device being tested at multiple cells according to another embodiment of the present invention.

Upon exiting the light source 20 and lens 21, the monochromatic light beam 22 passes to a plurality of light splitters 24, 28, 32, 36 that are linearly arranged such that the light beam 22 can reach each of the light splitters 24, 28, 32, 36. Each light splitter 24, 28, 32, 36 is configured to reflect a first portion of the light beam 22 while allowing a second portion of the light beam 22 to pass therethrough. As known in the art, a beam splitter is an optical device that splits a beam of light into two beams. As shown in FIGS. 1-3, the beam splitters 24, 28, 32, and 36 use a half-silvered mirror. For instance, the mirror can be made of a plate of glass with a thin coating of aluminium (usually deposited from aluminium vapor) with the thickness of the aluminium coating such that part, typically half, of light incident at a 45 degree angle is transmitted, and the remainder reflected. Instead of a metallic coating, a dielectric optical coating may be used. Depending on the coating that is being used, reflection/transmission ratios may differ in function of the wavelength. Of course, any suitable beam splitter 24, 28, 32, 36 can be used in accordance with the present invention. For example, the beam splitter can be a cube, made from two triangular glass prisms adhered together at their base using a resin. The thickness of the resin layer is adjusted such that (for a certain wavelength) half of the light incident through one "port" (i.e., face of the cube) is reflected and the other half is transmitted due to frustrated total internal reflection. Alternatively, polarizing beam splitters, such as the Wollaston prism, use birefringent materials, splitting light into beams of differing polarization. Another version of a beam splitter is a dichroic mirrored prism assembly which uses dichroic optical coatings to divide an incoming light beam into a number of spectrally distinct output beams.

As shown, the light beam 22 reaches the first light splitter 24, where a first reflected portion 25 of the light beam 22 is directed towards the PV device 10 and a first passthrough portion 22' of the light beam 22 continues through the first light splitter 24 towards the second light splitter 28.

Upon reaching the second light splitter 28, the first passthrough portion 22' of the light beam 22 is partially reflected toward the PV device 10 in the form of the second reflected portion 31 while a second passthrough portion 22" of the light beam 22 continues through the second light splitter 28 towards the third light splitter 32. This process then repeats for each of the remaining light splitters. As shown, four light splitters 24, 28, 32, 36 are present, although any suitable number of splitters can be utilized to test the desired number of locations within the cell 11.

Thus, in the embodiment shown, upon reaching the third light splitter 32, the second passthrough portion 22" of the light beam 22 is partially reflected toward the PV device 10 in the form of the third reflected portion 33 while a third passthrough portion 22''' of the light beam 22 continues through the third light splitter 28 towards the fourth light splitter 36. And, at the fourth light splitter 36 (acting as the final light splitter in this embodiment), the third passthrough portion 22''' of the light beam 22 is at least partially reflected to the PV device 10 in the form of a fourth reflected portion 37, while a fourth passthrough portion of the beam (not shown) may or may not pass through the fourth (i.e., final, in this embodiment) splitter 36.

Each reflected portion 25, 29, 33, 37 is directed toward a different area of the PV device. Prior to reaching the PV device, however, each reflected portion 25, 29, 33, 37 passes through a light chopper 26, 30, 34, 38 (respectively). The light choppers 26, 30, 34, 38 are configured to interrupt the continuous light of each reflected portion 25, 29, 33, 37 into pulsing light beams 27, 31, 35, 39 (respectively) such that the light reaching the PV device 10 is pulsed at a certain frequency. For example, the first light chopper 26 can interrupt the first reflected portion 25 into a first pulsing light beam 27; the second light chopper 30 can interrupt the second reflected portion 29 into a second pulsing light beam 31; the third light chopper 34 can interrupt the third reflected portion 33 into a third pulsing light beam 35; and, the fourth light chopper 38 can interrupt the fourth reflected portion 37 into a fourth pulsing light beam 39.

Figure 4:
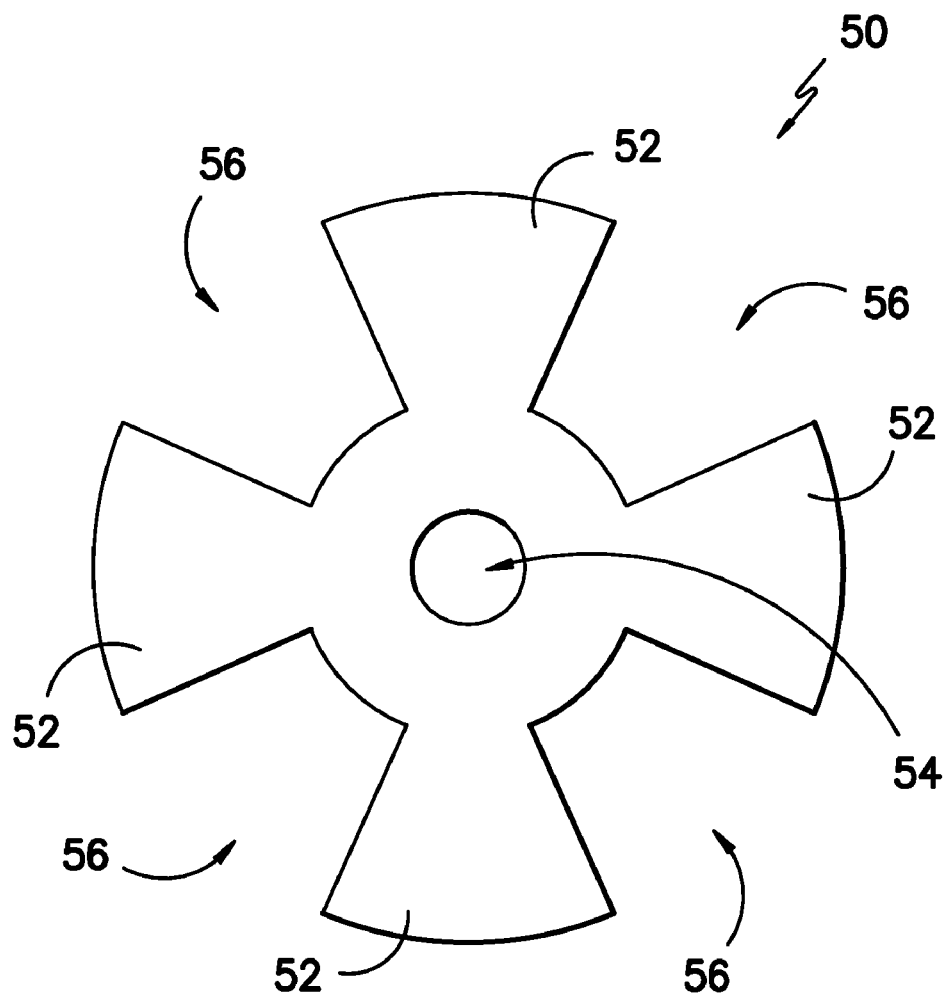
FIG. 4 shows an exemplary chopper wheel for use in one embodiment of the present invention; and, FIG. 5 shows an example of two QE curves from different CdS thicknesses in CdS/CdTe devices.

Any suitable light chopper can be utilized to pulse the light beams 27, 31, 35, 39 reaching the device 10. For example, FIG. 4 shows a chopper wheel 50 having blades 52 extending therefrom. The chopper wheel 50 rotates around the center 54 at a controlled speed (e.g., via a motor driven shaft). The light beam is oriented to be pulsed by the rotating chopper wheel 50 with the blades 52 blocking the light beam then the light beam passing through the gaps 56. The size of the blades and gaps, along with the speed of rotation (e.g., at a constant rotation speed), can be adjusted such that the light beam is pulsed at the desired frequency.

The frequency of each of the pulsing light beams 27, 31, 35, 39 are different from one another and are not multiples of each other. As such, each frequency can be detected specifically for each pulsing light beam 27, 31, 35, 39 on the PV device in order to calculate the quantum efficiency at points 15, 17, 18, 19 (respectively).

For example, the external quantum efficiency of the PV device 10 can be measured using monochromatic light chopped at a first frequency at the first position 15 and a second frequency at the second position 17. For instance, current measurements of the PV devices can be made at each wavelength using a lock-in amplifier referenced to the chopper frequency. For example, leads 42, 43 can be connected to a lock-in amplifier and computing device 40. As such, the quantum efficiency of the PV device 10 can be calculated at each position.

One possible range for chopping frequencies would be between 50 and 150 Hz. It is important to not use two frequencies that are multiples of each other because this will not allow for simultaneous and independent detection of the QE signals. For instance, a lock-in amplifier set to 50 Hz would detect a signal of 50 Hz, and also 100 Hz and 150 Hz. Two signals that would be independently resolvable, for instance, are 83 Hz and 116 Hz, which have no common multiples.

In one embodiment, the light source can be a LED light source having an output range of about 300 nm to about 1600 nm with approximately 10-50 nm spacing. The high spectral brightness (power per unit bandwidth per unit area per unit solid-angle) of LED's compares favorably with other more expensive conventional sources, while providing several additional benefits in the areas of wavelength stability, intensity stability, power consumption, ruggedness, modulation and pulsing capability and manufacturability. In this embodiment, the LED light source can be any LED or array of diodes, including those based on inorganic and organic materials.

Further, one or more of the LED's may be replaced with solid-state lasers. The current invention provides an array of LED's that are used to generate discrete narrow-band (typically <50 nm bandwidth) DC or pulse-modulated light emission. This array is called the lightsource according to the invention. It is within the scope of the invention where one or more of the LED's contained in the lightsource may be replaced with laser diodes, solid-state lasers or conventional lamps (e.g.—quartz tungsten halogen lamp, arc lamp, or metal halide lamp).

A time dependent signal is used to stimulate emission from each LED so that the response to each wavelength of light may be uniquely determined via properly timed data acquisition of the cell current (or voltage) output. In one aspect of the invention, a sequential (and non-overlapping) pulsing of many LEDs can be implemented.

In one particular embodiment, multiple light sources 20 can be used to test multiple PV cells 11 on the device, as shown in FIG. 3.

Figure 5:
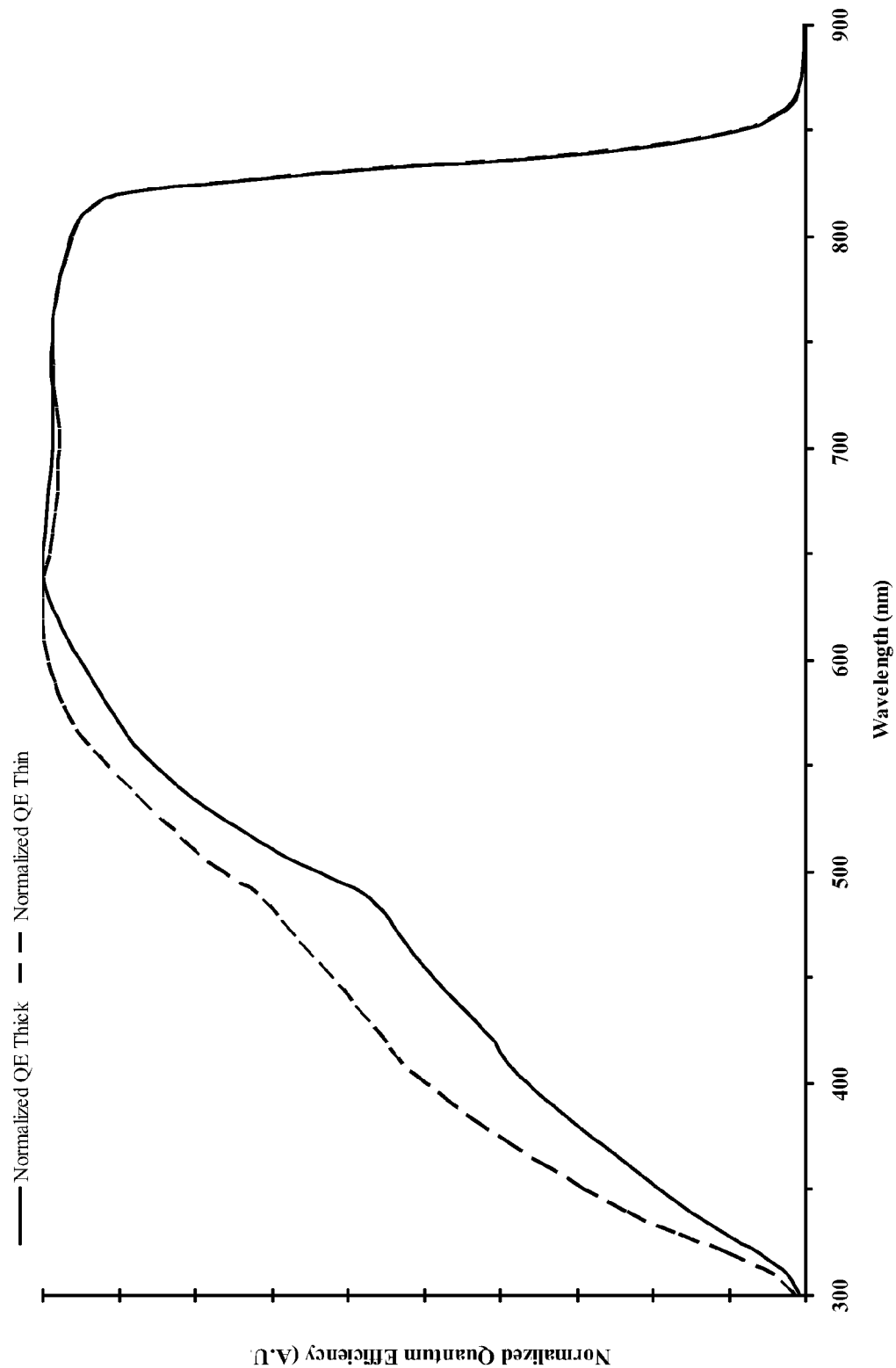

An example of two QE curves from different CdS thicknesses in CdS/CdTe devices is shown in FIG. 5. CdS absorbs light below about 520 nm but these photons are not captured as electrons. Thus, the device has lower QE in the CdS-absorbing region of the spectrum. By comparing the QE in the CdS absorbing region, say around 450 nm, to that above the CdS absorbing region, say around 600 nm, a relative CdS thickness can be determined. In the case of FIG. 5, the dotted line curve has a thinner CdS layer than the solid line curve.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of simultaneously making quantum efficiency measurements at multiple points in a photovoltaic cell, comprising:
    directing a light beam to a first beam splitter, wherein the light beam defines a monochromatic light;
    splitting the light beam at the first beam splitter into a first reflected portion and a first passthrough portion, wherein the first reflected portion is directed to a first point on the photovoltaic cell;
    chopping the first reflected portion at a first frequency between the first beam splitter and the first point;
    reflecting the first passthrough portion of the light beam at a second beam splitter to a second point on the photovoltaic cell;
    chopping the second reflected portion at a second frequency between the second beam splitter and the second point, wherein the first frequency is different than the second frequency; and,
    calculating the quantum efficiency at both the first point and the second point.

2. The method of claim 1, wherein the first frequency and the second frequency do not have a common multiple.

3. The method of claim 1, wherein the second beam splitter reflects the first passthrough portion of the light beam to the second point on the photovoltaic cell and allows a second passthrough portion of the light beam to pass through the second beam splitter.

4. The method of claim 3, further comprising:
    reflecting the second passthrough portion of the light beam at a third beam splitter to a third point on the photovoltaic cell;
    chopping the third reflected portion at a third frequency between the third beam splitter and the third point; and,
    calculating the quantum efficiency at the first point, the second point, and the third point.

5. The method of claim 4, wherein the third frequency is different than both the first frequency and the second frequency.

6. The method of claim 4, wherein the third beam splitter reflects the second passthrough portion of the light beam to the third point on the photovoltaic cell and allows a third passthrough portion of the light beam to pass through the third beam splitter.

7. The method of claim 6, further comprising:
    reflecting the third passthrough portion of the light beam at a fourth beam splitter to a fourth point on the photovoltaic cell;
    chopping the fourth reflected portion at a fourth frequency between the fourth beam splitter and the fourth point; and,
    calculating the quantum efficiency at the first point, the second point, the third point, and the fourth point.

8. The method of claim 7, wherein the fourth frequency is different than the first frequency, the second frequency, and the third frequency.

* * * * *